Dec. 19, 1967   G. E. BROWN   3,358,938
METHOD OF CONTROL OF PARTICLE SIZE UTILIZING VISCOSITY
Filed July 8, 1965   3 Sheets-Sheet 1

INVENTOR.
GRAHAM EDWARD BROWN
BY W. G. Hopley

Agent

United States Patent Office 3,358,938
Patented Dec. 19, 1967

3,358,938
METHOD OF CONTROL OF PARTICLE SIZE
UTILIZING VISCOSITY
Graham Edward Brown, Scarborough, Ontario, Canada, assignor to Union Carbide Canada Limited, Toronto, Ontario, Canada, a company of Canada
Filed July 8, 1965, Ser. No. 470,385
8 Claims. (Cl. 241—21)

ABSTRACT OF THE DISCLOSURE

The particle size of mineral material in particulate material processing equipment is controlled automatically by maintaining a slurry of such material and controlling the said equipment to maintain a constant average particle size by means of a signal varying in accordance with the viscosity of said slurry.

---

This invention relates to processes for controlling the particle size of solid particles of mineral matter by using a signal that varies in accordance with the viscosity of a slurry of the particles to automatically control equipment from which particulate material is derived.

The particle size of ore particles produced by grinding ore in a grinding mill commonly is controlled using a signal that varies in accordance with the sound of the mill in operation and/or the power required to operate the mill or other components of the grinding circuit. Such traditional methods of control are not always suitable, however. Thus, assume that a composite control signal representing both sound and power signals is being employed to control a grinding mill operating at maximum throughput for the particle size desired. Further assume that new hard-to-grind feed begins to enter the first grinding compartment of the mill. The level of material in this compartment will rise, because the grinding ability of the mill is substantially constant, but the feed material is harder to grind, and the sound sensing device, which acts quite quickly, will detect the increase in level and cause the feed to be reduced. After this change has become stabilized, and as a result of this change, material subsequently will be discharged from the mill which is ground too coarse. This happens since sound now can be produced in the mill at the same intensity as before by a slightly higher level of material in the mill because of the greater hardness of the feed material, it being understood that sound and level of material in the mill vary inversely. Other factors being constant, a slightly higher level of material ultimately will lead to a slightly coarse product.

In accordance with this invention, it has been discovered that the size of solid particles of mineral matter can be controlled quickly and accurately by employing a signal that varies according to the viscosity of a slurry of the particles.

In brief, in accordance with this invention there is provided a process for controlling the size of solid particles of mineral matter derived from particulate material processing equipment wherein a slurry of the particles is obtained, a signal varying in accordance with the viscosity of this slurry is produced, and this signal is used to automatically control the particulate material processing equipment.

Figure 1:
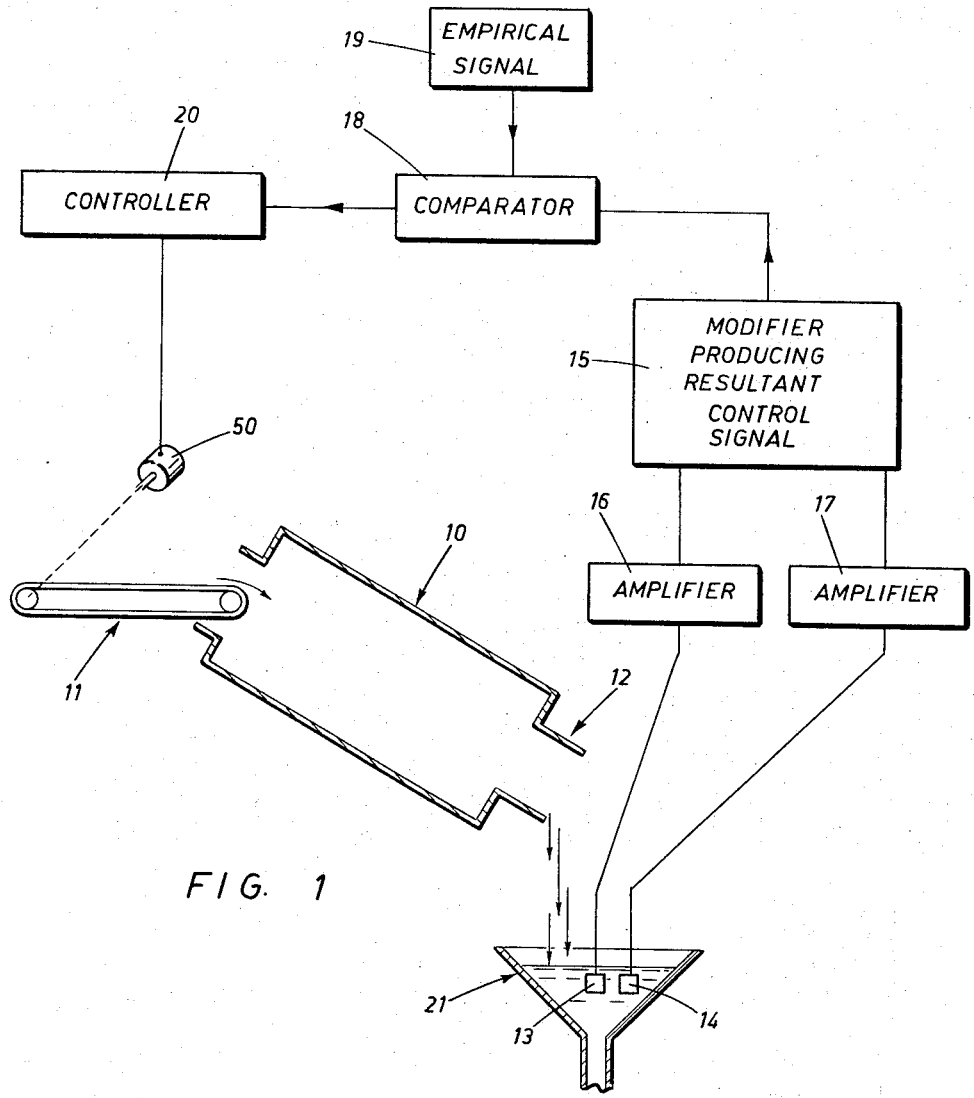
Figure 2:
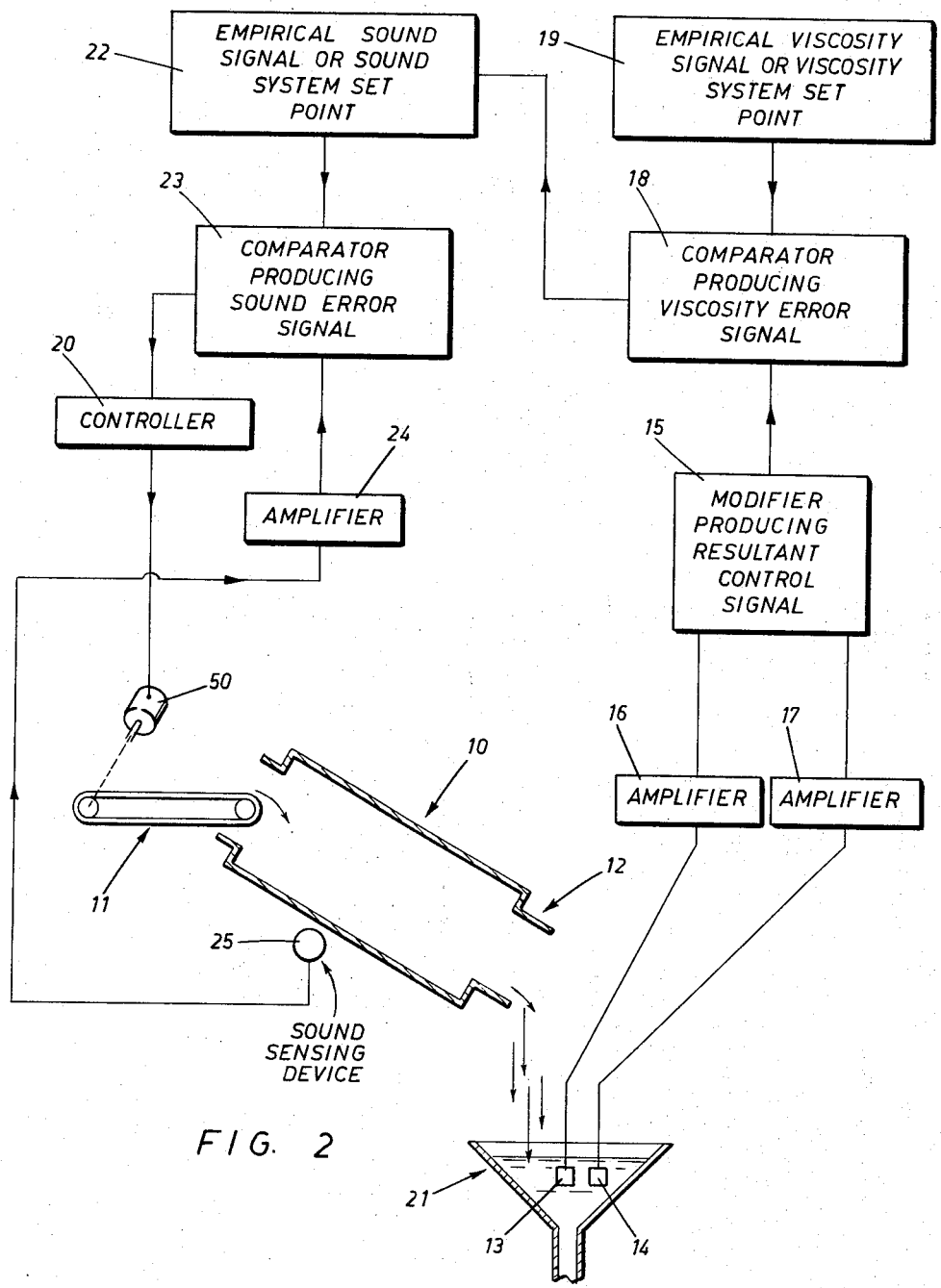
Figure 3:
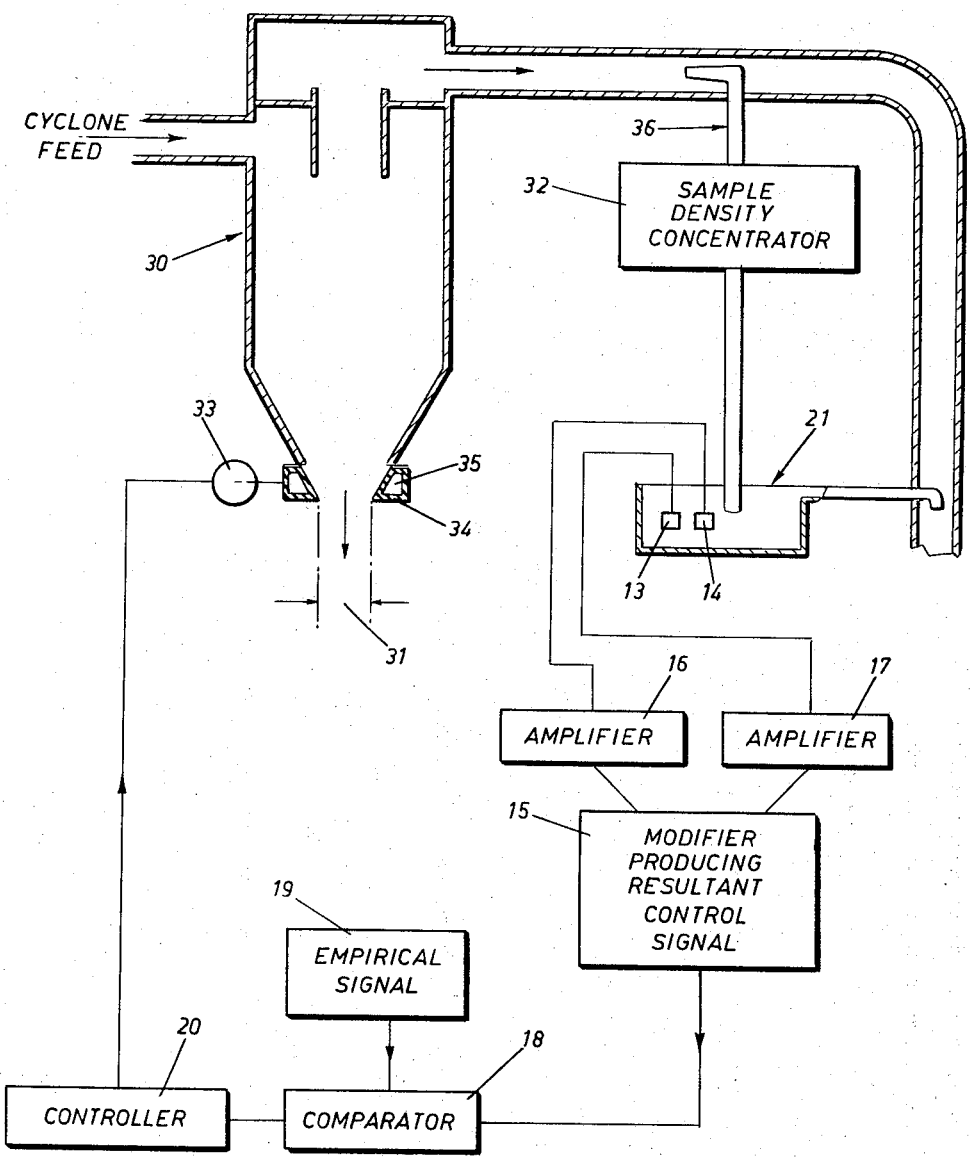

This invention will become more apparent from the following detailed description, taken in conjunction with the appended drawing, in which, FIGURES 1 and 2 show schematically two forms of equipment which may be used to control a grinding mill in accordance with this invention, and FIGURE 3 shows schematically equipment which may be used to control a wet cyclone in accordance with this invention.

The types of equipment which may be controlled in accordance with this invention may be broadly defined as follows: (a) equipment whose function is to reduce particle size or form small particles and (b) equipment whose function is to separate particles from one another in accordance with differences in particle size or surface area. Examples of the foregoing two types of equipment (a) and (b) are as follows:

(a) Grinding mills, pellet mills, ball, rod, autogenous, etc.; pan mills, hammer mills, roller mills, attrition mills, screen pulverizers, colloid mills, ring roll mills, jet pulverizers; shotting equipment, atomizers for metal, etc.; metal condensation equipment, chemical precipitation equipment, equipment for dissociating metal carbonyls, electrolytic deposition equipment, hydriding equipment, etc.; paint mills.

(b) Settling chambers, baffle chambers, cyclones, bag filters, scrubbing towers, Cottrell precipitators and similar apparatus for the separation of fine powders, dusts, mists, etc.; classifiers, cyclones, centrifuges, clarifiers, thickeners, decanters, screens and sieves, jigs, shaking tables, elutriators flotation cells, sink and float equipment and similar apparatus for size classification in the ore beneficiation, cement manufacturing and other industries.

The resistance offered by a fluid undergoing continuous deformation as a result of its subjection to a shear stress is called viscosity. A constant for true fluids at specific temperatures and pressures, this figure varies for suspensions and other substances in relation to the rate at which the suspension, etc., is being sheared. The measurement of viscosity of other than a true fluid made at a specific point on its stress-flow curve is termed apparent viscosity. It is this measurement which is referred to herein as viscosity. It may be secured by any recognized means, the most useful being those instruments adapted to give a continuous reading in terms of an electrical or pneumatic signal which can be used directly for control.

In practising this invention, solid particulate mineral material, the particle size of which is to be controlled, is obtained, preferably on a continuous basis. In order to permit signals varying in accordance with viscosity to be obtained, the particulate material must be in the form of a slurry. By the term slurry as used herein is meant a mixture or suspension of solid particles in a liquid or a gas. It may be obtained in this form directly from the processing equipment in some cases, while in other cases the particulate material may be in dry form, in which event it should be mixed with water or other suitable liquid or fluidized with air, or other suitable gas to form a slurry.

It is desirable for the density of the slurry to be kept constant. If this is not possible and the viscosity measuring device is density sensitive, it will be necessary to sense density variations and employ the resultant signal varying with density to modify the signal varying in accordance with both viscosity and density. In this regard, the viscosity of a slurry may vary due to several factors, chief among which is the total surface area of the particles suspended in the liquid and the consequent frictional effects caused by the liquid moving past this surface area. Such frictional effects are additive in terms of the reading of a viscosimeter. Considering suspensions of the same kind of particles in the same fluid, a given viscosity reading representing a given total surface area of particles may be obtained by either a small number of relatively coarse particles, or a much larger number of relatively finer particles, or variations of these two. To ensure that the viscosities of two such given suspensions may infer average surface area or particle size, some means of correcting for the number of particles, that is, the amount of material present in the slurry, must be made. This may be done most conveniently by measuring the weight percent of solids in the liquid or density of the slurry, as this figure is commonly called in the ore dressing and cement industries.

The criterion as to the necessity for correcting for density variations is the magnitude of the viscosimeter reading change due to density versus that due to particle size, which interrelation varies with different materials and conditions of measurement.

Care must be taken to ensure that the solids content of the slurry is not so high or so low as to make the viscosity probe respond incorrectly. Thus, when the total weight of particles in a liquid becomes so great as to make it impossible for particles to move through the liquid without scraping against each other, the frictional and other effects of these collisions result in the generation of signals from a viscosity probe which do not truly indicate variations in particle size. Similarly, if the solids content is too low, the measured viscosity will be essentially the viscosity of the liquid alone. In the case of a taconite ore ground to an average of about 6 microns, the slurry preferably should have a solids content between about 65% to 90% by weight.

It will be appreciated, however, that the range over which the amount of solid material in a slurry renders the slurry such that changes in viscosity thereof do not necessarily indicate changes in particle size depends on many factors such as particle shape and size, surface roughness of the particles, lubricating qualities of the liquid and attractive or repulsive forces between the particles. For any given type of particulate mineral matter, it is necessary to provide a slurry having a solids content such that changes in particle size create changes in viscosity of the slurry indicative of the change in particle size and of sufficient magnitude to permit satisfactory control of the equipment.

In general, particle size should be below about $50\mu$ (preferably below $25\mu$ for taconite ore ground to 6 microns), but in some cases it may be possible to obtain meaningful signals from denser slurries containing particles of a size greater than $50\mu$. The criterion with respect to particle size again is the ability to secure a viscosity signal which shows a sufficient degree of change with changing particle size as to permit tthe control of the equipment involved to a satisfactory degree.

If the density of the slurry is kept substantially constant, a control signal varying with viscosity, and which can be used to correct for changes in particle size, can be obtained using any suitable viscosity measuring device such as a "Brookfield" (trademark) viscometer, which provides a pneumatic signal or a "Dynatrol" (trademark) viscometer, which provides an electric signal, the sensing device of these instruments being immersed in the slurry. The slurry should be kept as quiescent as possible during measurement, but the particulate material must be maintained in suspension. On the other hand, if the density of the slurry varies and the viscosity measuring device is density sensitive, this can be accounted for by obtaining a signal indicative of density variations, and using this signal to correct the viscosity signal. Thus, the slurry of varying density may be passed through a gamma ray density gauge, and the electrical signal produced by this gauge used to modify the viscosity signal to provide a resultant control signal. One form of modification would be the subtraction of a predetermined proportion of the density signal from the viscosity signal. Alternatively, a density sensitive "Dynatrol" probe or a "Haliburton" (trademark) density gauge may be mounted in close proximity to the viscosity probe and the resultant signals combined as noted hereinbefore.

Any means for magnifying viscosity reading such as the addition of chemical agents to the slurry which will increase the frictional effect mentioned hereinbefore may be used in conjunction with the securing of the viscosity signal.

The resulting control signal corrected, if necessary for density, and thus proportional, although not necessarily linearly, to average particle surface area, and hence to average particle size, now may be used for equipment control.

The resultant control signal, if necessary, suitably adjusted for sense and size, may be continuously compared with an empirical standard signal representing the optimum particle size, and an error signal produced. The control signal may be electric, pneumatic, hydraulic, etc. The error signal indicating the variation from optimum particle size may be applied by a suitable servomechanism to some adjustable portion of the actual equipment to be controlled, or its auxiliary equipment, in such a way as to tend to correct the variation from optimum. This is the method of all automatic controls, and it is envisioned that any usual practices in the automatic control industry from the simple to the complex might be utilized. Thus the error signal may be variously used:

(a) As an overriding monitor or warning.

(b) As a direct single control from simple on-off operation to more sophisticated circuitry incorporating rate, reset, proportional band, and time delays.

(c) Similarly as in (b) but in conjunction with another signal or other signals.

(d) As a continuous means for varying an overall control set point of a control system operating primarily from another sensor.

Thus, assume an automatic grinding mill control to be operating in such a manner that a continuous signal derived from the sound of the mill is continuously compared with an empirical standard (or set point) and the resulting error signal used to vary the feed rate to the mill. The set point may be adjusted from time to time by the operator of the control for various reasons, of which one is a significant change in the daily laboratory screen analysis for particle size. Then, in accordance with one embodiment of this invention mentioned in (d) hereinbefore, a signal continuously derived and varying in accordance with the viscosity of a slurry made from the discharge of the mill may be continuously compared with an empirical signal representing desired average particle size and the resulting difference or error signal used to continuously vary the set point of the sound control system so that it reflects not the previous day's particle size analysis, but the present minute to minute variations in particle size. Alternatively, the viscosity signal may be used as a monitor to present a mill controlled primarily by some other method, e.g., by sound, from grinding over or under size limits. Alternatively, the viscosity signal may be used alone to control the equipment.

In FIGURE 1 there is shown a grinding mill 10 having a feed conveyor 11. A slurry containing solid particles of mineral matter is obtained at the output end 12 of the mill. Signals representative of density and viscosity variations of the slurry are obtained from a density sensing device 13 and a viscosity probe 14 which sense the viscosity and density of the slurry in a funnel type tank 21 into which mill 12 discharges. These signals are amplified in amplifiers 16 and 17 and supplied to and combined in an electronic modifier 15 that corrects the signal from probe 14 for variations in density. An electronic comparator 18 is provided. The amplified, corrected viscosity signal is compared in comparator 18 to an empirical signal indicative of desired particle size, the latter being supplied to comparator 18 from a source 19. The resultant error signal is applied to a controller 20 for controlling the speed of feed conveyor servomechanism 50. As slurry viscosity increases over optimum, indicating a trend toward too fine particles and overgrinding, conveyor 11 is speeded up. The resultant increase in feed increases the loading on the mill, which in turn, results in return of the particle size to optimum. This is indicative of one method which may be used for controlling equipment whose function is to reduce particle size or form small particles. As noted hereinbefore, pneumatic or hydraulic control systems may be employed.

In FIGURE 2, there is shown a very simple form of grinding mill control operating by sound control which is continuously modified by a viscosity control system. The sound of the mill 10 is picked up by a sensor 25, and this signal is amplified in an amplifier 24. The amplified signal is fed to a comparator 23 where it is compared with an empirical signal from a source 22, the empirical signal representing optimum sound level but being continuously modified as explained hereinafter. The resulting error signal enters controller 20 which acts to control feed belt 11 through servomechanism 50.

As in FIGURE 1, a slurry containing solid particles of mineral matter is obtained at the output end 12 of the mill. Signals representative of density and viscosity variations of the slurry are obtained from a density sensing device 13 and a viscosity sensing device 14, sensing the viscosity and density of the slurry in a funnel type tank 21 into which mill 10 discharges. These signals are amplified in amplifiers 16 and 17, then supplied to and combined in an electronic modifier 15. An electronic comparator 18 is provided. The amplified, corrected viscosity signal is compared in comparator 18 to an empirical signal indicative of desired particle size, the latter being supplied to comparator 18 from a source 19. The resultant error signal is applied to the empirical sound signal source 22 in such a manner as to continuously vary it around its set point in accordance with the particle size issuing from the mill.

Considering now the result of the combination of these two control systems, assume the mill to be grinding at optimum particle size and throughput when harder to grind feed enters. The sound control system using the existing sound control set point as reference will respond almost immediately to slow the feed belt and attempt to maintain particle size as desired, but at a somewhat lower throughput. Should this correction, for reasons previously discussed, result in somewhat unsatisfactory particle size when the ground material actually leaves the mill, the viscosity control system will automatically manipulate the sound set point causing the faster acting sound system to once again regulate the feed so as to completely satisfy the particle size requirements.

In the case of equipment such as a wet cyclone in a ball mill grinding circuit whose function is to separate into two streams particles of different sizes while in suspension, the error signal from comparator 18 may be employed to control the diameter of the apex opening, the density of cyclone feed or the pressure of the cyclone feed, and thus vary the point at which the size separation is made. The viscosity signal thus can be used to continuously correct the average particle size of the cyclone product.

In FIGURE 3 a conventional wet cyclone 30 is shown schematically. The diameter of the apex opening 31 of cyclone 30 can be varied in a known manner by varying the fluid pressure supplied by a pump, valve or other device 33 to an annular chamber 35 in a rubber ring 34 at the apex opening of cyclone 30.

A continuous sample taken from the overflow of cyclone 30 is conducted via a line 36 to a sample density concentrator 32 (which may be a small cyclone, a filter, a flash dryer, etc.). The product of concentrator 32, which is more concentrated than the overflow from cyclone 30, is collected in an overflow type tank 21, and the viscosity and density of this slurry measured. The control system is the same as previously described in connection with FIGURE 1 except that controller 20 controls device 33 to vary the fluid pressure supplied to chamber 35. This varies the diameter of apex opening 31 which, in turn, controls the size of the particles discharging from apex opening 31, as well as those overflowing from cyclone 30.

While it is desirable in all applications of this invention to generate a viscosity varying signal on a continuous basis, it should be noted that this invention may be practised by generating this signal intermittently.

As this invention may be embodied in several forms without departing from the spirit or essential characteristics thereof, the present embodiments being therefor illustrative and not restrictive, and since the scope of the invention is defined by the appended claims, all changes that fall within the metes and bounds of the claims or that form their functional as well as conjointly co-operative equivalents are therefore intended to be embraced by those claims.

The embodiments of the invention in which an exclusive property or privilege is claimed are defined as follows:

1. A process for automatically controlling the size of particles of solid mineral material derived from particulate material processing equipment which comprises; obtaining a slurry of said particles, producing a signal varying in accordance with the viscosity of said slurry, and using said signal to automatically vary the set control system for maintaining the size of said particles in said processing equipment substantially constant.

2. A process according to claim 1 wherein said particulate material processing equipment comprises means for forming material into small particles and feeding means for feeding said material to said means for forming said material into small particles.

3. A process according to claim 2 wherein said signal is used to control the rate at which said feeding means supplies said material to said means for forming said material into small particles.

4. A process according to claim 3 wherein said means for forming said material into small particles comprises grinding means for grinding said material.

5. A process according to claim 1 wherein said particulate material processing equipment comprises means for separating particles of different sizes from each other.

6. A process according to claim 1 wherein the average size of said particles is less than about 50μ.

7. A process for automatically controlling the size of particles of solid mineral material derived from particulate material processing equipment which comprises; obtaining a slurry of said particles, producing a signal varying in accordance with the viscosity of said slurry, producing another signal varying in accordance with at least the sound of said particulate material processing equipment, producing a composite signal from said signals, and using said composite signal automatically to control said particulate material processing equipment to maintain the average size of said particles substantially constant.

8. A process for automatically controlling the size of particles of solid mineral material derived from particulate material processing equipment which comprises; obtaining a slurry of said particles, producing a signal varying in accordance with the viscosity of said slurry, producing a signal indicative of desired particle size, comparing said signals and deriving an error signal therefrom, and using said error signal to automatically vary the set point of another control system for maintaining the size of said particles substantially constant.

References Cited

UNITED STATES PATENTS

| | | | |
|---|---|---|---|
| 2,824,701 | 2/1958 | Vester et al. | 241—34 X |
| 3,094,289 | 6/1963 | Fahlstrom | 241—34 |
| 3,114,510 | 12/1963 | McCarty et al. | 241—34 |
| 3,145,935 | 8/1964 | Wilson | 241—34 X |

FOREIGN PATENTS

| | | |
|---|---|---|
| 145,078 | 4/1962 | Russia. |
| 667,001 | 7/1963 | Canada. |

WILLIAM W. DYER, JR., *Primary Examiner.*

W. D. BRAY, *Assistant Examiner.*